United States Patent [19]
Smith

[11] Patent Number: 5,845,790
[45] Date of Patent: Dec. 8, 1998

[54] APPARATUS AND RELATED METHOD FOR INTERCONNECTING ARTICLES

[75] Inventor: Aron J. Smith, Sherburne, N.Y.

[73] Assignee: Smith Tool & Die, Inc., Sherburne, N.Y.

[21] Appl. No.: 861,795

[22] Filed: May 22, 1997

[51] Int. Cl.[6] .................................................. A47G 19/08
[52] U.S. Cl. .................................. 211/41.12; 206/308.1; 220/23.4; 403/217; 211/88.01; 211/126.3
[58] Field of Search .................... 211/41.12, 41.18, 211/88.01, 126.3, 126.4, 194, 182; 220/23.4; 206/308.1; 108/64, 185, 192; 403/217, 218, 170

[56] References Cited

U.S. PATENT DOCUMENTS

| | | | |
|---|---|---|---|
| 124,870 | 3/1872 | Willard | 220/23.4 |
| 3,000,532 | 9/1961 | Miklich | 220/23.4 |
| 3,002,612 | 10/1961 | Poupitch | 220/23.4 X |
| 3,554,382 | 1/1971 | Grinbergs . | |
| 3,661,434 | 5/1972 | Alster | 312/257.1 X |
| 4,008,553 | 2/1977 | Oliver | 220/23.4 X |
| 4,187,786 | 2/1980 | Feig et al. | 108/64 |
| 4,706,576 | 11/1987 | James | 108/192 |
| 5,477,594 | 12/1995 | Lepage | 211/194 X |
| 5,564,801 | 10/1996 | Hesener et al. | 211/40 X |
| 5,715,948 | 2/1998 | Hung | 206/308.1 X |

FOREIGN PATENT DOCUMENTS

| | | | |
|---|---|---|---|
| 2336934 | 2/1975 | Germany | 220/23.4 |

*Primary Examiner*—Blair M. Johnson
*Attorney, Agent, or Firm*—Wall Marjama Bilinski & Burr

[57] ABSTRACT

Apparatus for interconnecting a plurality of articles includes a connecting member having a circular walled periphery, a portion of which is selectively engaged by at least one arcuate slotted portion provided on each of the articles to provide interconnection therebetween. The arcuate slot matches the curvature and thickness of the connecting member. According to the invention, a plurality of connecting members can interconnect a variable number of articles to create expandable planar arrangements which can also be secured to a mounting surface, such as a wall or table-top. In a preferable embodiment, the articles and connecting members can also be stacked one upon another to form an expandable vertical arrangement.

11 Claims, 5 Drawing Sheets

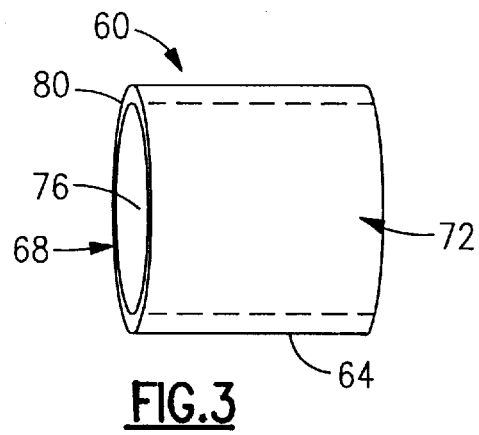
FIG.3
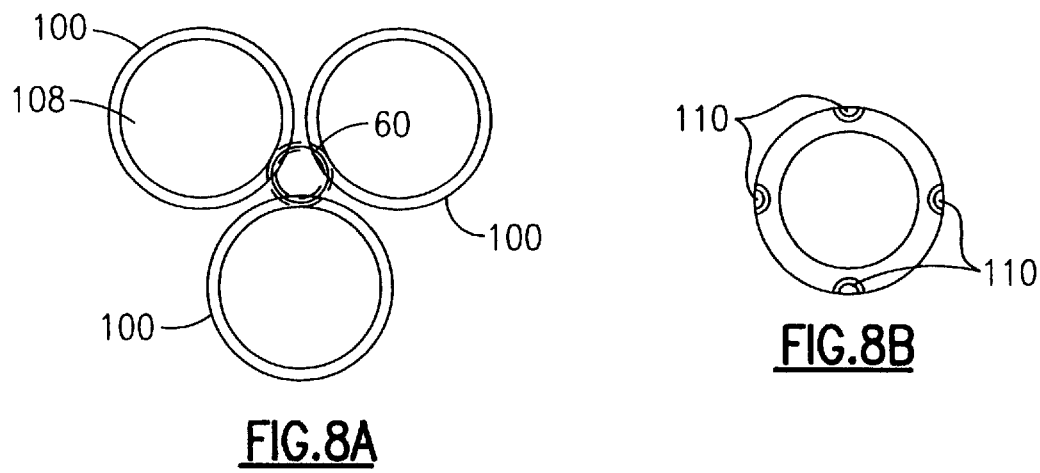
FIG.8A
FIG.8B
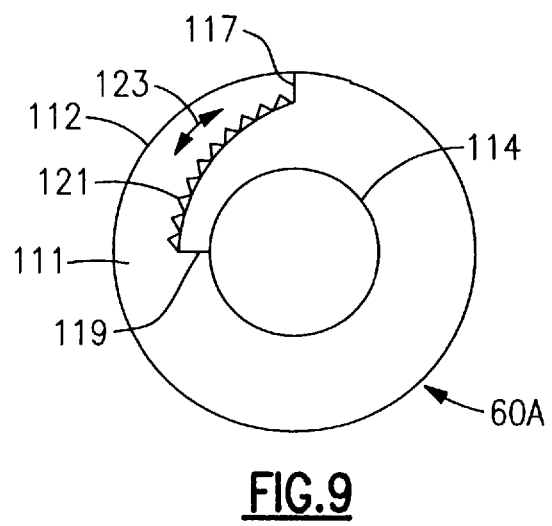
FIG.9

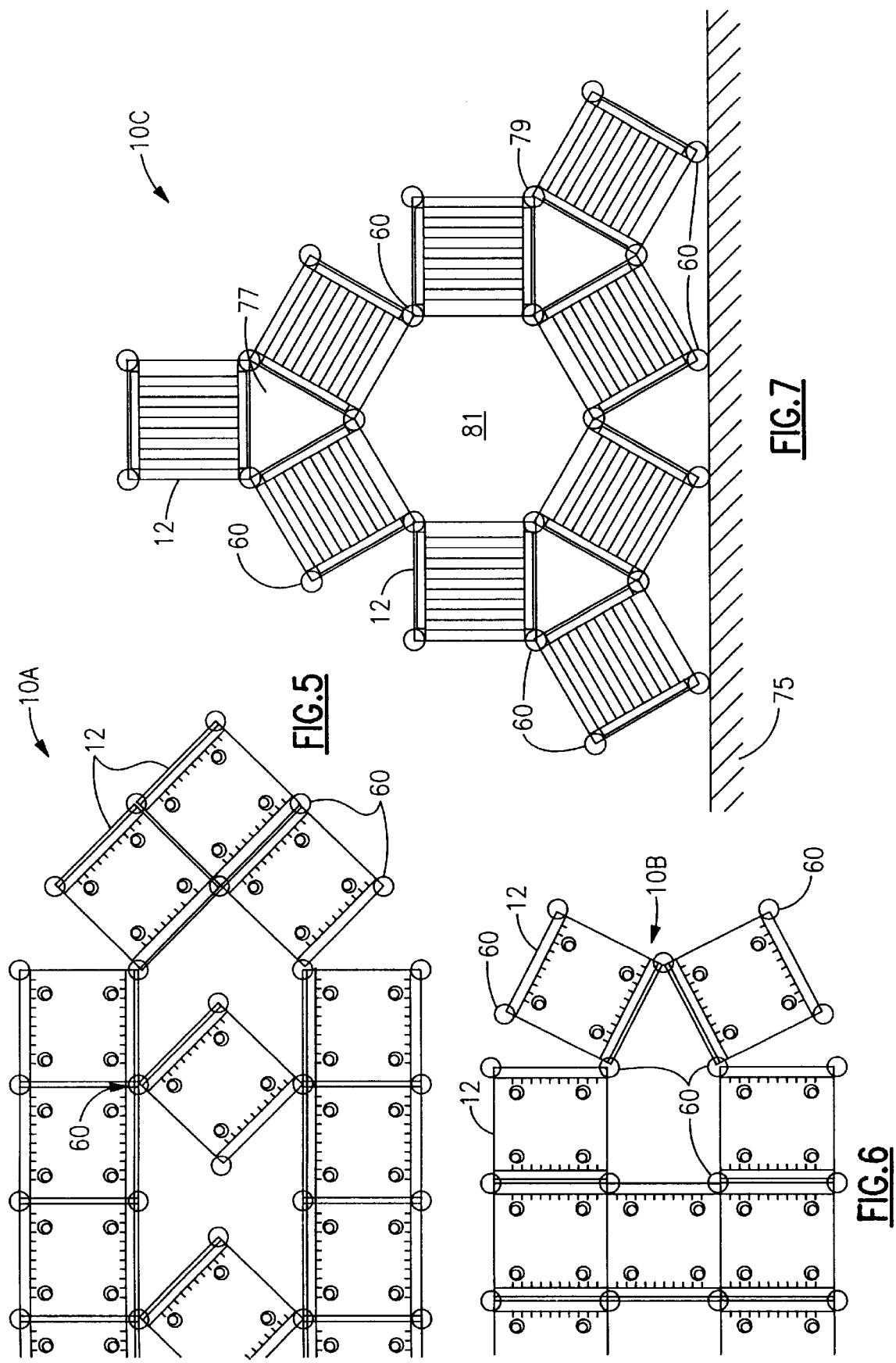

APPARATUS AND RELATED METHOD FOR INTERCONNECTING ARTICLES

FIELD OF THE INVENTION

This invention relates to the field of connectable articles, and more particularly to a connection apparatus and method which allows a set of articles to be interconnected so as to form an expandable planar arrangement, such as for display or storage.

BACKGROUND OF THE INVENTION

There are a number of known techniques for interconnecting a series of articles, such as found in toys, games, and other applications. One such notable application is in the field of storage systems devised for retaining accumulated or collectable articles, such as audio and/or video tape cassettes, video games, and compact discs (CDs). A number of these systems include a unitary storage housing with an interior having a plurality of parallel slots or openings which are appropriately sized and spaced to allow the discs, cassettes, or other articles to be retained in a stacked relationship.

The storage housing according to these known systems can be manufactured to a predetermined size. Alternately, however, the systems can be expanded by the interconnection of a number of smaller housings. For example, a large vertical tower can be purchased or, a number of smaller-sized housings can be stacked one on top of the other in a vertical configuration. Expandability is often desirable based on the growth of the collection of contained articles. An example of a known display or storage unit of this type is described in U.S. Pat. No. 5,195,642, issued to Dardashti. According to this patent, a plurality of rectangular shaped housings include fastener holes in the ends or sides thereof, allowing a number of the housings to be bolted together to form a completed display arrangement. A number of planar and vertical arrangements can be therefore be assumed. In storage systems as described by U.S. Pat. No. 4,678,245, issued to Fouassier, and U.S. Pat. No. 4,196,812, issued to McInnis, the storage housings include slots in the sides or the top and bottom of the housings to allow interconnection therebetween.

Though the preceding storage systems provide a convenient way of storing compact discs or other articles, the number of possible expandable arrangements are somewhat limited. That is, each of the described systems can be expanded either by connecting the housings in an end to end manner or by stacking the housings one upon another to form either a planar or a vertical configuration. Certain user requirements, however, require greater flexibility in the ability to store and retain articles.

Other storage housings can be used for display purposes, an example as disclosed in U.S. Pat. No. 5,462,177, issued to O'Donnell. A flat rectangular storage member includes a number of inset recesses, each recess being sized for receiving a single or double sized compact disk. The storage member is mountable to a wall surface and can be interconnected with other similar members to form a planar arrangement. As in the preceding storage systems, however, the number of possible arrangements which can be assumed is more or less limited to end to end or similar orientations.

There is a need, then, to provide an improved and expandable connection method, particularly for modular storage systems, but which is useful for literally any application that requires or utilizes interconnection of a variable set of articles. Moreover, there is a need to provide apparatus for interconnecting articles, such as storage containers and the like, which is compact, simple to assemble or disassemble, is flexibly expandable, which provides a high degree of artistic versatility and efficiently saves space in different environments and/or user applications.

SUMMARY OF THE INVENTION

A primary object of the present invention is to provide an improved method of interconnecting a variable number of articles.

It is another primary object of the present invention to provide apparatus for interconnecting articles in a manner which is simpler and more convenient than is presently known in the prior art and moreover, is useful in a varied number of applications.

It is yet another primary object of the present invention to improve the state of the art of storage systems.

Another primary object of the present invention is to increase the efficiency of known storage systems to allow increased versatility and expandability for storing different articles in a simple, efficient, and entertaining manner.

It is yet another primary object of the present invention to provide a storage system which can be reliably configured in a multiple number of ways to meet different user demands and environments.

Therefore, and according to a preferred aspect of the present invention, there is provided a method for interconnecting a number of articles together, said method including the steps of:

fitting an arcuate slotted portion of a first article onto a portion of a walled periphery of a circular connecting member; and fitting an arcuate slotted portion of a second article to a separate portion of the walled periphery of said circular connecting member, thereby interconnecting said first and second articles.

According to a preferred embodiment, a plurality of articles are releasably interconnected using a plurality of circular connecting members to produce a variety of expandable and varied planar arrangements which can be conveniently configured by movement and/or addition of articles to the created interconnected combination.

More preferably, the articles can be disposed in a radial manner about the circular walled periphery of the connecting members to form radial combinations which are finctional as well as aesthetic.

Preferably, any number of articles can be interconnected by using a plurality of connecting members for interconnecting the articles in a varied number of planar relationships, wherein each article includes several separate arcuate portions, increasing the possible number of arrangements.

According to another preferred aspect of the present invention, there is provided an apparatus for interconnecting at least two articles, said apparatus comprising:

a connecting member having a substantially circular walled periphery, wherein said at least two articles include a frame having at least one arcuate slotted portion sized for selectively engaging a portion of the circular walled periphery of said connecting member.

According to yet a more specific aspect or application of the present invention, there is provided an expandable storage system comprising:

at least two article retaining members; and means for releasably interconnecting said at least two article retaining members together, said means including a connecting member having a substantially circular periphery, wherein said at least two article retaining members include a frame having at least one arcuate slot disposed on an exterior surface which is sized for selectively engaging a portion of the circular periphery of said connecting member.

Preferably, each of the article retaining members includes a plurality of arcuate slotted portions, each of the slotted portions having a radius, curvature and slot width which conforms substantially to a portion of the thin-walled circular periphery of the connecting member. Preferably, a plurality of connecting members allows varied and selective interconnection of a plurality of article retaining members. A number of planar configurations can therefore be assumed wherein the article retaining members can also be provided with means for securing the arrangements to a planar surface, such as a wall, in a modular arrangement which can vary is size and shape depending on the application.

In a preferred embodiment, the article retaining members can also be vertically stacked, one upon another, thereby further increasing the versatility of the described system.

According to yet another aspect of the present invention, there is provided in combination, at least two articles, each article including a frame, and a plurality of connection members, each of said connection members having a substantially circular walled periphery, wherein each said frame includes at least one arcuate slotted portion disposed on an exterior surface sized for engaging at least a portion of the circular periphery of at least one of said connection members.

Preferably, a plurality of articles can be selectively combined with a number of connection members to thereby define an expandable arrangement.

An advantage of the present invention is that the above described connection technique and apparatus is useful for a number of varied applications.

Another advantage of the present invention is that more specifically, the described storage system can be formed and expanded vertically and/or planarly, and in some combinations radially with respect to an interconnecting member, with the range of possible planar arrangements being increased as compared to previously known storage systems.

Another advantage of the present invention is that the storage system is modular, therefore allowing an adopted configuration to be selectively expanded.

Another advantage of the present invention is that any created storage arrangement can then be selectively reconfigured with a minimum of tear-down time or expense.

Another advantage of the present invention is that the connecting elements can be made small enough to maximize storage space using a minimum number of storage containers. In addition, the connecting members and/or the spaces formed between articles, can also effectively be used as part of the storage volume; such as for retaining pens, markers, etc.

These and other objects, features, and advantages will be further described according to the following Detailed Description of the Invention which should be read in light of the accompanying drawings.

BRIEF DESCRIPTION OF THE DRAWINGS

FIG. 3 is a side perspective view of a connector element used with the container shown in FIGS. 1 and 2;

FIGS. 5–7 are views of alternate storage arrangements using a plurality of the containers shown in FIGS. 1, 2, 4 and the connector element of FIG. 3 in accordance with the present invention;

FIG. 8(a) is a top plan view of an alternate container storage system using a plurality of circular containers in lieu of rectangular members;

FIG. 8(b) is a plan view of one of the circular containers used in the storage system of FIG. 8(a); and FIG. 9 is a plan view of a configuration for connecting elements in accordance with an alternate embodiment.

DETAILED DESCRIPTION OF THE INVENTION

The following discussion relates to a pair of specific embodiments of a modular storage system having the connection method and apparatus embodying the present invention. Terms are used throughout the discussion, such as "back", "front". "top", "bottom", etc. These terms are merely intended to provide a frame of reference and are not intended to limit the scope of the present invention. It will be readily apparent through the course of the following discussion, however, that many variations and modifications are easily imagined embodying the teachings of the present invention. Moreover, it should also be stressed that the concepts described herein relate to other separate applications, apart for storage systems, such as toys, machinery, or any planarly structured arrangement.

Figure 1:
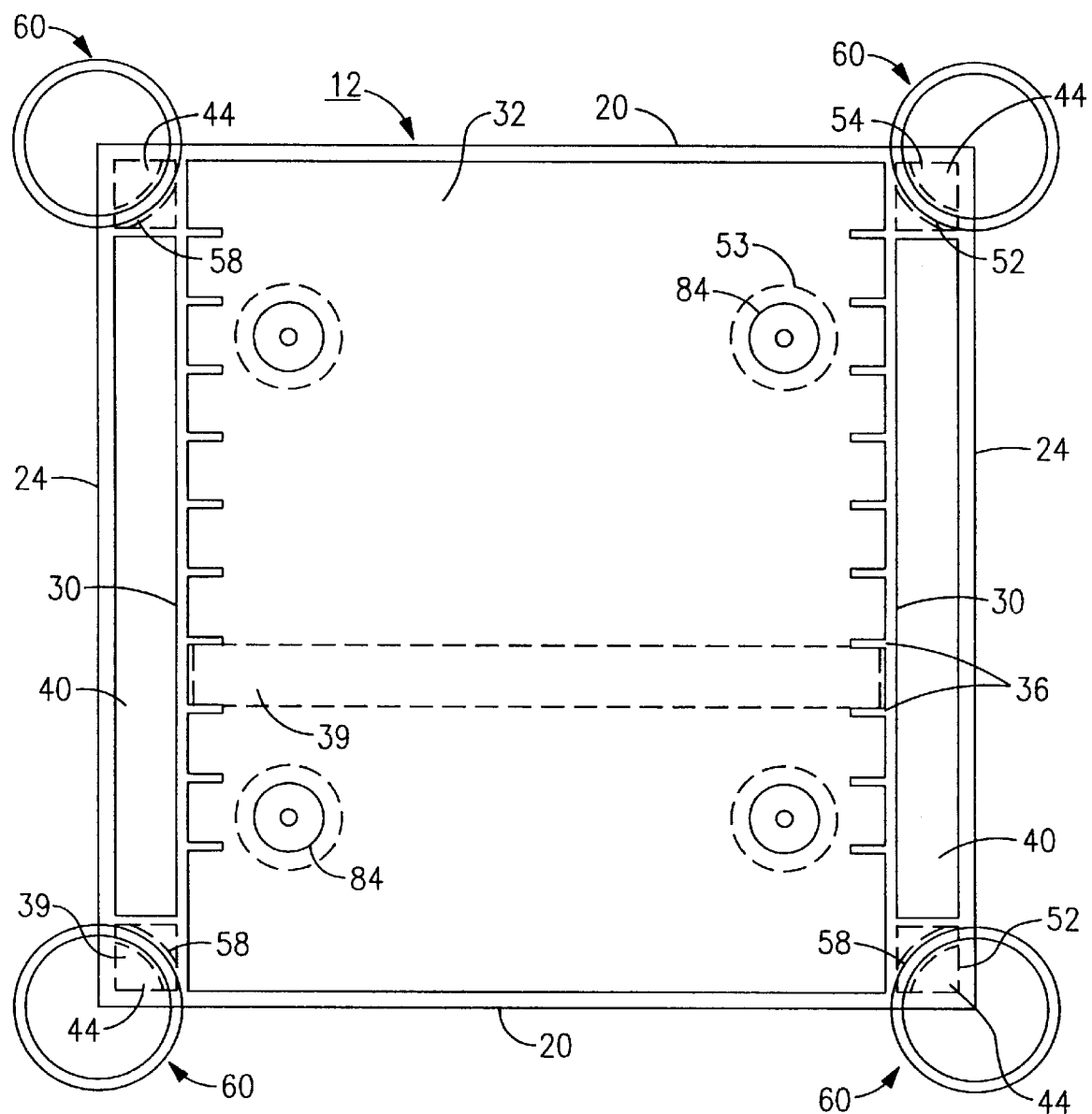
FIG. 1 is a top plan view of a portion of a modular container system in accordance with a preferred aspect of the present invention.
Figure 2:
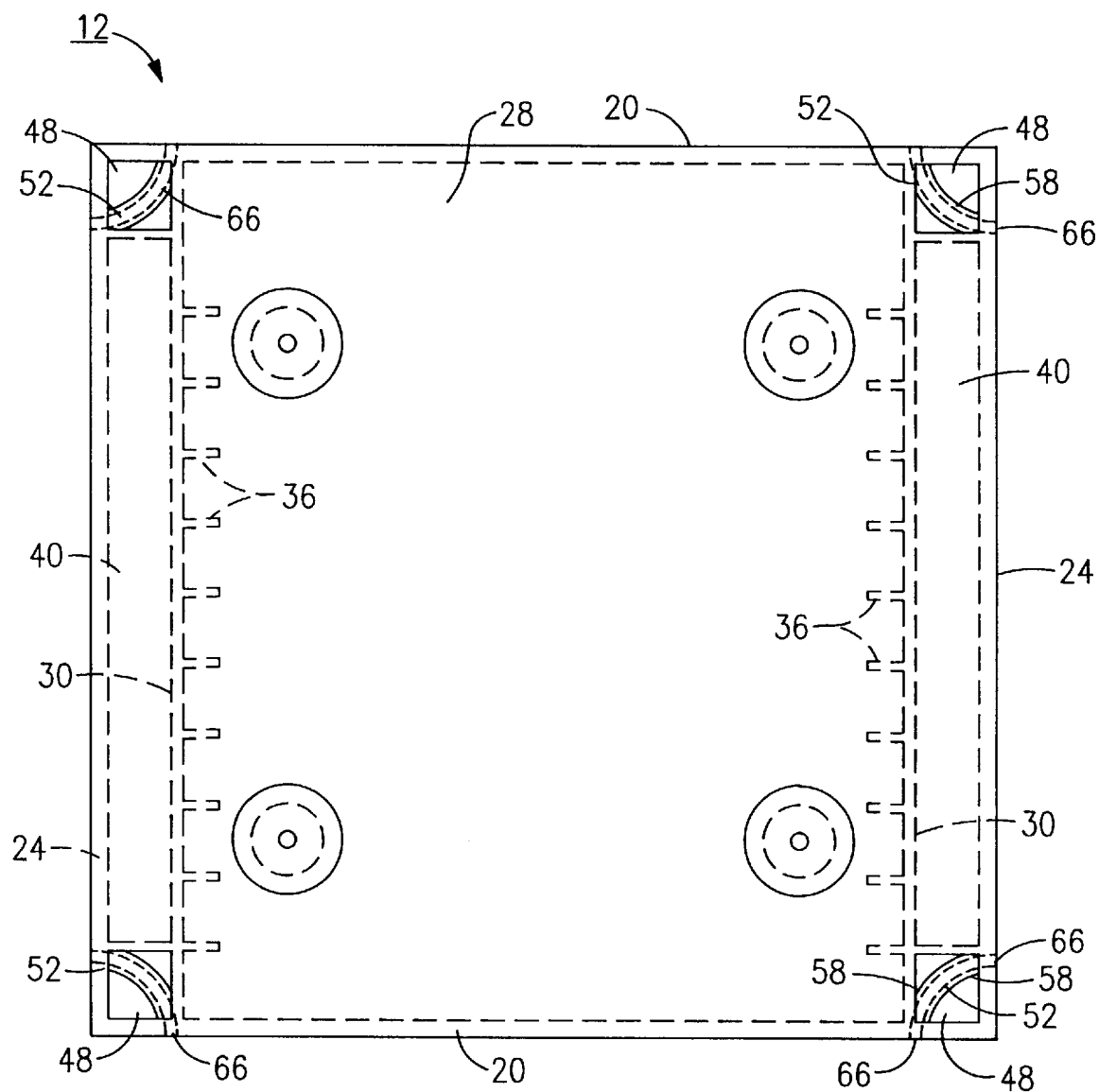
FIG. 2 is a bottom view of the container shown in FIG. 1.
Figure 4:
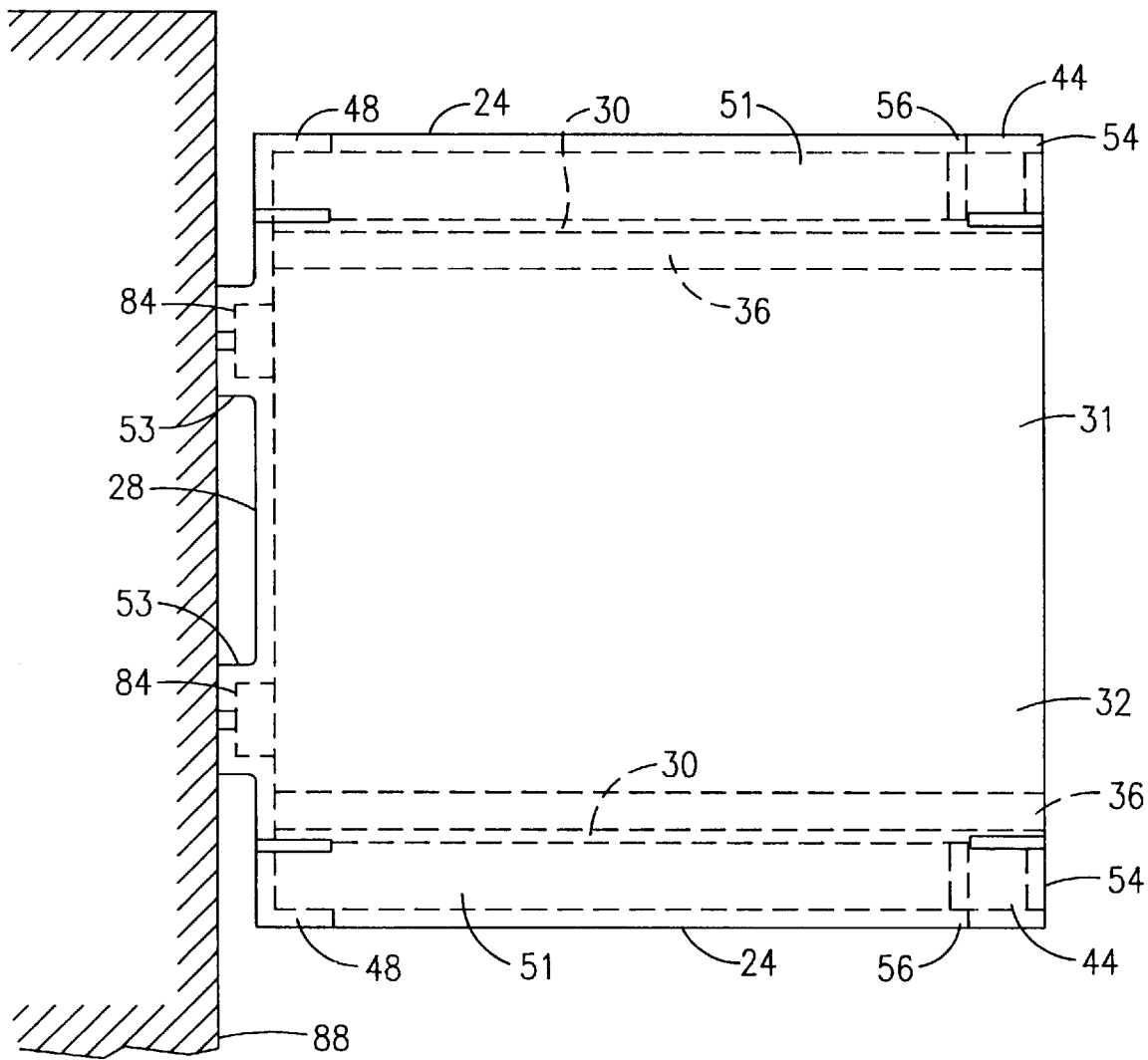
FIG. 4 is a side elevational view, partially in phantom, of the container of FIGS. 1 and 2 as used in conjunction with a mounting surface.

Referring now to the Figures, and specifically to FIGS. 1, 2, and 4, there is shown an article retaining member or container 12 used in accordance with a preferred embodiment of the present invention for retaining audio compact discs. For purposes of this embodiment, the article retaining member 12 is defined by an injection or otherwise plastic-molded frame 16 having a rectangular configuration. The frame 16 comprises two pairs of orthogonal side walls, 20, 24, each of which depends from a planar bottom wall 28 to form an opposite top open end 31. An additional pair of interior sidewalls 30 extending parallel to one of the pairs of sidewalls 24 forms a storage cavity 32 which also extends upwardly from the bottom wall 28 to the top open end 31. The storage cavity 32 includes height, width and depth dimensions which are approximately equal to corresponding dimensions of an audio compact disc, or approximately 5 inches×5 inches×6 inches. For the sake of completeness, each of the exterior side walls 20, 24, and the bottom wall 28 of the presently described container 12 have a nominal thickness of approximately 0.125 inches, while the interior sidewalls 30 also have a thickness of approximately 0.125 inches.

A plurality of spaced parallel tabs 36 extend inwardly from each of the interior side walls 30 to form slotted openings 43 and define a shelving arrangement for a plurality of compact disc 39, one shown in phantom in FIG. 1. According to this embodiment, 10 openings are provided, with an end opening 45 being double sized to accommodate a double-sized compact disc (not shown).

An additional pair of rectangularly shaped storage cavities 40 are bounded between each of the interior sidewalls 30 and the sidewalls 24. Each storage cavity 40 is sized to retain a single compact disc, having dimensions of approximately 5.0 inches×6.0 inches×0.44 inches, though it will be readily apparent to one of ordinary skill in the field that the number and location of available storage spaces can be easily varied.

Still referring to FIGS. 1, 2, and 4, and according to this embodiment, each of the corners 48 on the bottom wall side of the container 12 include cored portions 51 extending substantially through the depth of the frame 16. In addition, the bottom wall 28 also includes a series of equally spaced outwardly depending feet 53 having through mounting openings 84, each opening being sized to accommodate a threaded fastener (not shown) or other known fastening element to allow the container 12 to be fixedly mounted to a wall 88, tabletop or other suitable mounting surface. Preferably, the mounting openings 84 are countersunk to allow the fasteners (not shown) to be seated without interfering with the storage of compact discs within the spaced interior 32.

Each of the corners 44 in the top open side of the frame 16 includes a pair of spaced horizontal plates 54, 56 having a corresponding pair of spaced vertical arcuate plates 58 sandwiched therebetween. The upper horizontal plate 54 includes a flat planar surface which is flush with the ends of the sidewalls 20, 24, including a defined arcuate gap 52 corresponding to the spacing between the vertical plates 58. The gap 52 extends into corresponding arcuate segments 62 cut into the sidewalls 24, 20 of each corner 44 to define a continuous arc. As shown, each of the vertical plates 58, the bottom horizontal plate 56 and the sidewalls 20, 24 define sides and a bottom for the arcuate segment 52 and along with the upper horizontal plate 54 have a nominal thickness. According to this embodiment, the arcuate segment 52 has a defined radius of about 0.594 inches.

A similar construct is formed in the bottom wall side of the container 12, with identically shaped arc segments 66 being cut into each of the sidewalls 20, 24 at each corner 48. Because of the cored portions 51, the remainder of the overall defined arcuate segment according to this embodiment is essentially hollow. The arcuate segments 52 are used as retaining sites for a connecting member 60, the description of which follows.

Referring to FIG. 3, the connecting member 60 is also an injection or otherwise plastic molded section defined by a hollow cylindrical body portion 64 and having a pair of circular open ends 68 and 72, forming a circular periphery with respective inner and outer contact surfaces 76, 80. For purposes of this embodiment, the connecting member 60 has an outer diameter of approximately 1.188 inches, and an inner diameter of approximately 1.038 inches, with the circular periphery having a thickness of about 0.075 inches. The thickness of the circular periphery can therefore be fitted selectively into the arcuate slot 52 provided in the corners 44, 48 of the container 12. It will be appreciated that the size of the arcuate slot 52 and the circular periphery of the connecting member 60 can easily be varied.

In operation, and with reference to FIGS. 5–7, the modular storage system can assume a number of different stacking configurations, such as those denoted as 10A, 10B and 10C, each formed by selective interconnection at the corners 40, 44 of the containers 12 using the circular connectors 60. As is clear from the specifically depicted configurations, an arcuate slot 52 occupies only approximately one quarter portion of the circular periphery of the connecting member 60, allowing up to four (4) containers 12 to be selectively and releasably attached to a single connecting member. As such, radial, end to end, and a number of alternate arrangements can be created, with the number of possible configurations being left to the user's imagination. For example, in the combination 10C, FIG. 7, the assembly combination can be placed on a horizontal surface 75, such as a table top or floor with the connecting members 60 providing a stable base. Furthermore, additional spaces 77, 79 and 81 are formed which allow storage of other articles other than CDs. As is also apparent, such arrangements provide challenging geometric design which stimulate and encourage creation of other varied combinations and selectively using more or fewer elements.

Preferably, the inner contact surface 76 in each of the connecting members 60 includes a slight inward taper which is correspondingly matched within each arcuate slot 52 of the container 12. In this manner, the connecting members 60 can be easily engaged within the slot 52 and then press-fitted therein, ensuring retention, but allowing release therefrom if a predetermined force is exceeded. For example, an inward taper of about 2 degrees is desirable. An attached container 12 can be freely movable about the circular periphery, creating increased versatility without having to tear down portions of an arrangement, or the containers can be effectively locked in a specific radial position by attachment of at least one other corner to another connecting member, such as shown in each of FIGS. 5–7. Still further, the connecting members 60, having a relatively small cross section, does not occupy a significant portion of the total storage surface area.

The use of the inward taper can be further utilized by making the inner radius of the connecting member smaller than the inside diameter of the arcuate slotted portion, thereby achieving a tightened fit upon press fitting of the connecting member into place.

Still further, and though the described connecting members include a fixed attachment diameter, it is conceivable to provide means for adjusting this diameter to allow a user to selectively increase or decrease the size of the connecting member and/or to vary the amount of clamping force on interconnected articles.

For example, the connecting member can be made openended and include slots or tabs (not shown) for engaging one or both ends. Similar means can be imagined, thereby also increasing the versatility of the interconnecting apparatus. An example is illustrated in FIG. 9 in which the connecting member 60A includes, a ring-like body portion 111, a section of which is split, the split section being defined by a pair of radially extending slits 119, 117, spaced apart from one another circumferentially and extending from inner and outer circumferential surfaces 114, 112, respectively, to an intermediate radial position. The slits 119, 117 extend axially through the entirety of the connecting member 60A. An adjustable section 124 defined at the intermediate radial position interconnects respective inner and outer ends of the slits 117, 119. The adjustment section 124 is of an arcuate shape and includes a series of teeth 121 arranged on one facing surface thereof for engaging a plurality of correspondingly disposed cavities on an opposing facing surface.

In use, the arcuate adjustment section 124 can be selectively opened and/or closed to vary the overall size of the connecting member 60A by shifting the position of the teeth 121 relative to the cavities in the facing surface, as needed, and shown in the direction 123.

By providing retaining sites at each corner 44, 48 in the open end as well as the bottom wall side of the container 12, as described, allows the user to versatility configure stacked article containers. Those configurations which are illustrated in FIGS. 5–7 are merely typical of those which can be created.

As is apparent from the preceding discussion, the modular containers 12 can literally assume an infinite number of possible planar and/or vertical stacking arrangements, thereby forming a modular container system.

Referring to FIGS. 8(a) and 8(b), an alternate modular container system can be described which includes a plurality of article containing members 100 having a circular cross section, as opposed to the rectangular or rhombic cross sections of the preceding embodiment. The members 100 are defined by a circular housing 104 having an interior defined by reference numeral 108 sized for retaining articles, for example, loose papers or envelopes. The interior 108 can additionally be provided with slots or pockets (not shown) to further organize the articles being stored, if desired. According to this embodiment, the circular housing has a number of cutouts 110, each cutout having a radial cut which approximates that of the circular connecting member 60, which as in the preceding embodiment allows the article retaining members to be interconnected be intersecting a portion of the circular periphery. Only one set of cutouts 110 are illustrated in FIG. 8(a), though the number and spacing thereof can easily be varied to provide versatility, as shown in FIG. 8(b).

Though the discussion has settled on the use of compact disc retaining members, it will be readily apparent to one of ordinary skill in the art, that other containers having different shapes can be used for retaining other articles using the unique attachment scheme herein described. That is to say, although the preceding embodiment utilizes corners having arcuate slots for engaging the periphery of the connecting member, it is possible that the containers could, for example, be defined by a circular or substantially circular cross section. Furthermore, the containers can contain interiors sized to securely retain other articles; such as papers, toys, video games, tape cassettes, and the like.

In addition, and though the connecting member 60 has been illustrated as a solid member, it is conceivable to optionally vary the structure thereof; for example, a suitable connecting member could be made from a ring of wire, or similar material, which is sized to fit within the arcuate slots of the corner retaining sites.

PARTS LIST FOR FIGS. 1–8(b)

10A arrangement of articles
10B arrangement of articles
10C arrangement of articles
12 containers
16 rectangular frame
20 sidewall
24 sidewall
26 open end
28 bottom wall
30 interior sidewalls
31 top open end
32 enclosure
36 tabs
39 compact disc
40 cavities
44 corners upper
48 corners lower
51 cored portions
52 arcuate slot
53 feet
54 horizontal upper plate
56 horizontal lower plate
58 vertical plates
60 connecting member
60A connecting member
62 arc segments
64 body portion
66 arc segments
68 open end
72 open end
75 horizontal surface
76 inner contact surface
77 space
79 space
80 outer contact surface
81 space
84 mounting openings
88 mounting surface
100 article retaining members
108 interior
110 radial cutouts
111 circular periphery
112 outer surface
114 inner surface
117 slot
119 slot
121 teeth
123 arrow While this invention has been explained with reference to the structure disclosed herein, it is not confined to the details set forth and this invention is intended to cover any modifications and changes as may come within the scope of the following claims:

I claim:

1. A combination including at least two articles and at least one connecting member, said at least one connecting member having a substantially circular thin-walled periphery, each of said at least two articles including a rectangular frame structure having a plurality of side walls, a bottom wall and an open end oppositely disposed relative to said bottom wall and defining a storage interior, said open end including respective corners defined by said side walls, each of said corners having at least one arcuate slot sized for selectively and releasably engaging any circumferential portion of the circular thin-walled periphery of said at least one connecting member, and wherein each of said at least one arcuate slot and said at least one connecting member include corresponding inward tapers for allowing positive engagement therebetween.

2. A combination as recited in claim 1, including a plurality of connecting members and a plurality of articles to allow selective interconnection therebetween in forming multiple expandable planar configurations.

3. A combination as recited in claim 1, wherein the interior of said containers includes a plurality of spaced slots.

4. A combination as recited in claim 1, wherein said articles include mounting means for fixedly mounting an interconnected combination to a mounting surface.

5. A combination as recited in claim 4, wherein said mounting means includes a plurality of mounting feet extending outwardly from said bottom wall of said at least two articles, each of said mounting feet having through openings sized for receiving a fastening element.

6. A modular storage system comprising:
at least two article retaining members; and
means for releasably interconnecting said at least two article retaining members together, said means including at least one thin-walled cylindrical connecting member having a substantially circular periphery, wherein each of said at least two article retaining members include a frames structure including a plurality of side walls, a bottom wall, and an open end oppositely disposed relative to said bottom wall, said open end having a plurality of corners, and in which each of said corners includes an arcuate slot sized to conform to any selected circumferential portion of the circular periphery of said connecting member.

7. A modular storage system as recited in claim 6, wherein each of said arcuate slots of said at least two article retaining members and said thin-walled periphery of said connecting member include corresponding inward tapers for allowing positive engagement therebetween.

8. A compact disc carrier system comprising:

at least two compact disc storage containers, each of said storage containers having a rectangular frame structure including a plurality of side walls and a bottom wall defining an interior sized for containing a plurality of compact discs, said storage containers further including an open end oppositely disposed relative to said bottom wall for allowing compact discs to be placed in and removed from said interior; and at least one cylindrical thin-walled connecting member having a circular periphery, wherein each of said at least two compact disc storage containers includes an arcuate slotted portion disposed on corners on at least said open end of said container, each said arcuate slotted portion being sized for receiving a selected circumferential portion of said thin-walled cylindrical connecting member.

9. An expandable compact disc carrier system as recited in claim 9, in which each of said arcuate slotted portions and the periphery of said at least one cylindrical connecting member include corresponding inward tapers for allowing positive engagement therebetween.

10. An expandable compact disc storage system as recited in claim 9, wherein the defined interior of each compact disc storage container includes a plurality of spaced slots, each slot being sized for retaining at least one compact disc.

11. An expandable compact disc storage system as recited in claim 10, wherein said plurality of spaced slots includes a first set of slots defining a stacking arrangement within said interior and a pair of second slots oppositely and substantially arranged relative to said first set of slots, said sets of slots being defined by said side walls and by a pair of oppositely disposed interior walls.

* * * * *